US011454698B2

(12) United States Patent
Ikram et al.

(10) Patent No.: US 11,454,698 B2
(45) Date of Patent: Sep. 27, 2022

(54) RADAR MOUNT-ANGLE CALIBRATION

(71) Applicant: TEXAS INSTRUMENTS INCORPORATED, Dallas, TX (US)

(72) Inventors: Muhammad Zubair Ikram, Richardson, TX (US); Adeel Ahmad, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 255 days.

(21) Appl. No.: 16/679,404

(22) Filed: Nov. 11, 2019

(65) Prior Publication Data

US 2020/0158820 A1 May 21, 2020

Related U.S. Application Data

(60) Provisional application No. 62/770,409, filed on Nov. 21, 2018.

(51) Int. Cl.
*G01S 7/40* (2006.01)
*G01S 7/41* (2006.01)
*G01S 13/93* (2020.01)
*G01S 13/931* (2020.01)
*G01S 13/06* (2006.01)

(52) U.S. Cl.
CPC ............ *G01S 7/4004* (2013.01); *G01S 7/41* (2013.01); *G01S 13/06* (2013.01); *G01S 13/931* (2013.01); *G01S 2013/9314* (2013.01); *G01S 2013/9315* (2020.01); *G01S 2013/9321* (2013.01)

(58) Field of Classification Search
CPC .......... G01S 7/4004; G01S 7/41; G01S 13/06; G01S 2013/9315
See application file for complete search history.

(56) References Cited

U.S. PATENT DOCUMENTS

2019/0150357 A1\* 5/2019 Wu ........................ A01C 21/00

FOREIGN PATENT DOCUMENTS

JP 2017133861 A \* 8/2017

OTHER PUBLICATIONS

Ikram, Muhammad Z. and Ahmad, Adeel. "Automated Radar Mount-Angle Calibration in Automotive Applications." IEEE Radar Conference 2019, 5 pages.

\* cited by examiner

*Primary Examiner* — Thomas M Hammond, III
*Assistant Examiner* — Helena H Seraydaryan
(74) *Attorney, Agent, or Firm* — Carl G. Peterson; Charles A. Brill; Frank D. Cimino

(57) ABSTRACT

A device includes one or more processors configured to receive radar data, and generate a plurality of occupancy grid maps based on the radar data. Each of the occupancy grid maps corresponds to a respective one of a plurality of candidate angles. The one or more processors is also configured to select one of the candidate angles as a sensor mount angle based on the occupancy grid maps, and trigger an action based on the sensor mount angle and the radar data.

20 Claims, 5 Drawing Sheets

RADAR MOUNT-ANGLE CALIBRATION

CROSS-REFERENCE TO RELATED APPLICATIONS

The present application claims priority to U.S. Provisional Patent Application No. 62/770,409, filed Nov. 21, 2018, entitled "Automated Radar Mount-Angle Calibration in Automotive Applications," which is hereby incorporated herein by reference in its entirety.

BACKGROUND

Advanced driver assistance systems (ADAS) are included in automobiles and other vehicles to improve safety by reducing human operation error. These systems are enabled by sensors, such as automotive radars (e.g., millimeter-wave automotive radars). In an automotive radar system, one or more radar sensors may be used to detect obstacles around the vehicle and the speeds of the detected objects relative to the vehicle. A processing unit in or coupled to the radar system may determine the appropriate action needed, e.g., to avoid a collision or to reduce collateral damage, based on the processing of signals generated by the radar sensors. Automotive radar systems are capable of detecting objects and obstacles around a vehicle, the position of any detected objects and obstacles relative to the vehicle, and the speed of any detected objects and obstacles relative to the vehicle. Via the processing unit, the radar system may, for example, alert the vehicle driver about potential danger, prevent a collision by controlling the vehicle in a dangerous situation, take over partial or complete control of the vehicle, assist the driver with parking the vehicle, and/or perform other automotive control functions.

SUMMARY

A method and apparatus for calibrating the mount angle of a radar sensor are disclosed herein. In one example, a device includes one or more processors configured to receive radar data, and generate a plurality of occupancy grid maps based on the radar data. Each of the occupancy grid maps corresponding to a respective one of a plurality of candidate angles. The one or more processors is also configured to select one of the candidate angles as a sensor mount angle based on the occupancy grid maps, and trigger an action based on the sensor mount angle and the radar data.

In another example, a method includes receiving radar signals reflected by an object, and generating a plurality of occupancy grid maps based on the radar signals. Each of the occupancy grid maps corresponds to a respective one of a plurality of candidate angles. The method also includes selecting one of the candidate angles as a sensor mount angle based on the occupancy grid maps, and triggering an action based on the sensor mount angle and the radar signals.

In a further example, a vehicle includes a radar sensor and one or more processors. The radar sensor is configured to receive radar signals. The one or more processors are coupled to the radar sensor, and are configured to generate a plurality of occupancy grid maps based on the radar signals. Each of the occupancy grid maps corresponds to a respective one of a plurality of candidate angles. The one or more processors is also configured to select one of the candidate angles as a mount angle of the radar sensor based on the occupancy grid maps, and control the vehicle based on the mount angle and the radar signals.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

In automotive, and other applications, the accuracy and precision of object localization depends on calibrating the radar sensor mount position and angle with respect to the vehicle coordinates. The accurate determination of sensor mount position and angle is especially important if multiple radar sensors are mounted on the vehicle. Given that multiple radar sensors will often have a spatially and temporally overlapping field-of-view, the absence of good sensor calibration may adversely impact the performance of any application that requires accurate mapping and perception. While the calibration should be precise, it should also be repeatable, easy to perform and automated to the extent possible.

Figure 1:
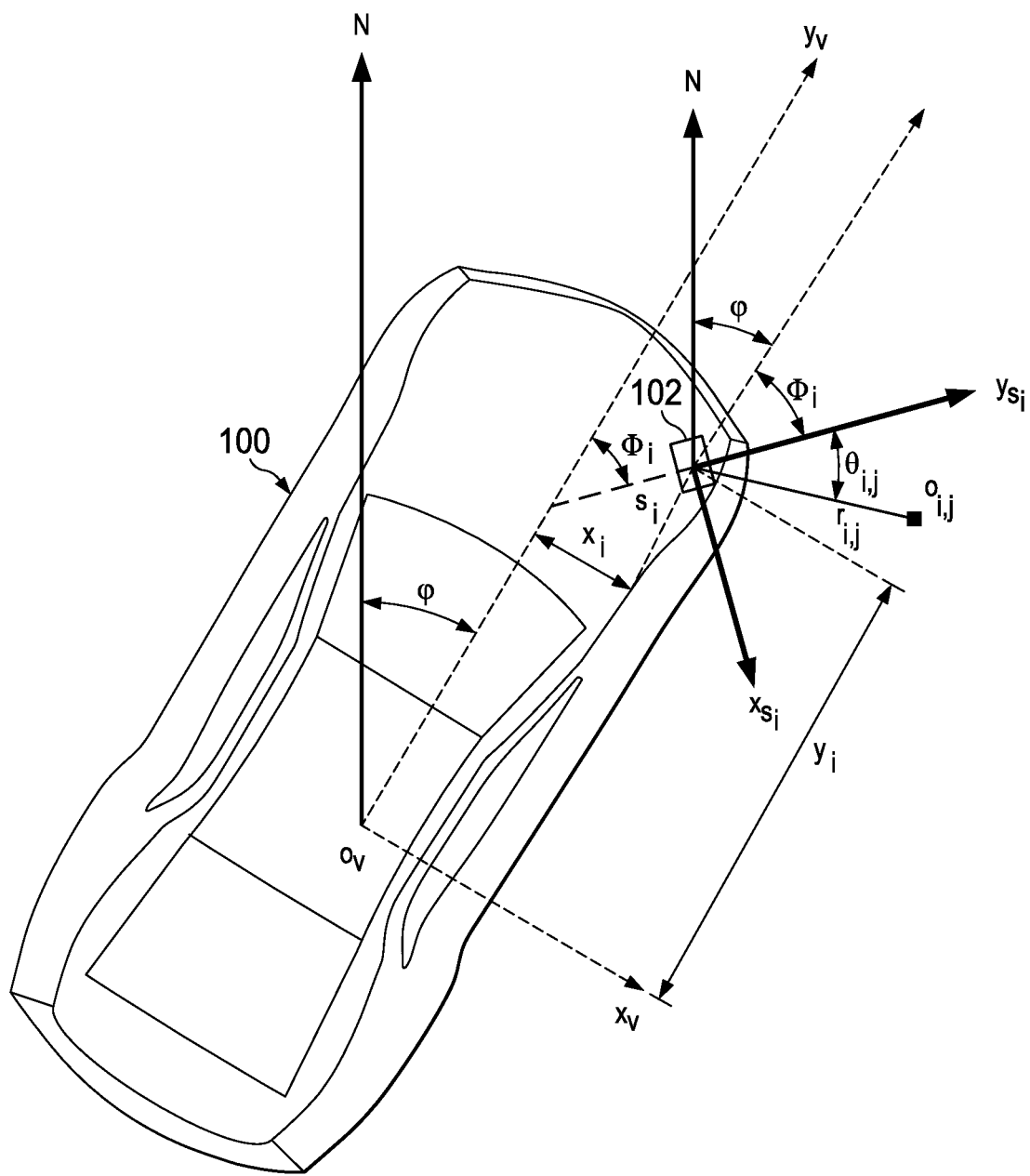
FIG. 1 shows an example vehicle that includes a radar sensor.

FIG. 1 shows a vehicle 100 that includes a radar sensor for detecting objects. In FIG. 1, the vehicle 100 is oriented at an angle $\varphi$ with respect to the global or world coordinates represented by its north (N) direction. The vehicle axes are represented by $x_v$ and $y_v$, respectively. A radar sensor i is mounted on the vehicle on its top right corner at an angle $\theta_i$ with respect to the vehicle y axis. Note that the sensor axes are represented by $x_{si}$ and $y_{si}$, respectively. An Object j is located at a distance $r_{ij}$ and angle $\theta_{ij}$ from the radar sensor i. In the sensor coordinate system, the object location is given by:

$$o_s = \begin{bmatrix} r_{ij}\sin\theta_{ij} \\ r_{ij}\cos\theta_{ij} \end{bmatrix}. \tag{1}$$

If the location of radar sensor i in vehicle coordinates is represented by the vector $[x_i \ y_i]^T$, then the object location in global coordinates, assuming the vehicle 100 is in resting position at origin, is given by $$o_g = T(\varphi)\left[\begin{bmatrix} x_i \\ y_i \end{bmatrix} + T(\phi_i)\begin{bmatrix} r_{ij}\cos\theta_{ij} \\ r_{ij}\sin\theta_{ij} \end{bmatrix}\right], \quad (2)$$

where the transformation T(α) is given by $$T(\alpha) = \begin{bmatrix} \cos\alpha & \sin\alpha \\ -\sin\alpha & \cos\alpha \end{bmatrix}. \quad (3)$$

In the case where the vehicle 100 has a displacement from origin of $[x_v, y_v]^T$, the object location becomes $$o_g = \begin{bmatrix} x_v \\ y_v \end{bmatrix} + T(\varphi)\left[\begin{bmatrix} x_i \\ y_i \end{bmatrix} + T(\phi_i)\begin{bmatrix} r_{ij}\cos\theta_{ij} \\ r_{ij}\sin\theta_{ij} \end{bmatrix}\right]. \quad (4)$$

Equation (4) shows that the object location depends on sensor translation $[x_i, y_i]^T$ as well as sensor orientation or rotation $\emptyset_i$. These parameters are static and do not change as long as the sensor position and orientation are not altered. All other parameters in equation (4) change as the vehicle 100 changes its course and path. The process of correcting for sensor translation and rotation is referred to as sensor extrinsic calibration.

In some systems, radar calibration is largely manual. As a first step, referred to as translational calibration, the location of the radar sensor with respect to the center of vehicle axis is measured. Distances to vehicle origin may be hand measured with the aid of leveling lasers. With reference to FIG. 1, the translational calibration results in estimating distances $x_i$ and $y_i$.

The radar mount angle $\emptyset_i$ with reference to the vehicular coordinates is estimated as a second step of calibrating the radar sensor. One method for radar mount-angle calibration is based on trilateration or triangulation process. In this method, at least three point targets (e.g., corner reflectors) are placed at known positions relative to each other. A position of one of the point targets, e.g., $(x_1^{CR}, y_1^{CR})$ is selected as a reference while the relative positions of the other two point targets—$(x_2^{CR}, y_2^{CR})$ and $(x_3^{CR}, y_3^{CR})$ are assumed to be known. Next, the radial positions $r_1^{CR}, r_2^{CR}$, and $r_3^{CR}$ as well as the angles $\theta_1^{CR}, \theta_2^{CR}$, and $\theta_3^{CR}$ of the point targets from the radar sensor whose mount angle needs to be calibrated are measured. The radial positions ($r_1^{CR}, r_2^{CR}, r_3^{CR}$) are then used to estimate the position $(x_1, y_1)$ of the radar sensor using trilateration. Subsequently, by using the known positions of the target objects i.e., $(x_1^{CR}, y_1^{CR})$, $(x_2^{CR}, y_2^{CR})$, and $(x_3^{CR}, y_3^{CR})$ and the position of the radar sensor $(x_1, y_1)$ measured by trilateration, the ground truth angles $\theta_1^{CR,G}, \theta_2^{CR,G}, \theta_3^{CR,G}$ are found based on the geometry of the scene. The difference between the angle measured through the geometry and the estimated measurements using the radar sensor produces the mount angle for that particular radar sensor. In other words, $$\theta_i^M = \theta_i^{CR,G} - \theta_i^{CR}, \quad i=1,2,3. \quad (5)$$

The difference can then be averaged to give an estimate of the mount angle:

$$\hat{\theta}_i = \frac{1}{3}\sum_{i=1}^{3}\theta_i^M. \quad (6)$$

The calibration method described above is time consuming and the relative positions of the point objects must be known with reasonable accuracy to produce useful results. The method is not applicable in practical scenarios where the radar sensor, once mounted on a vehicle, will inevitably become misaligned over time due to mechanical wear of the mount, shock, etc.

In contrast to the manual calibration described above, the radar sensor calibration apparatus and method disclosed herein allow vehicular radar sensors to be calibrated while the vehicle is in service. The method is time efficient, does not require the use of prearranged calibration targets, and can be fully or partially automated.

Equation (4) shows that the location of an object in the global coordinates depends non-linearly on the radar mount angle $\emptyset_i$. Using the correct value of the mount angle guarantees that a point object appears at the same location on a grid map as the vehicle borne radar moves past the point object and receives reflections from the point object at various locations. In other words, a point object occupies fewest grid cells in the occupancy grid map if the correct mount angle is used in the computation. Examples of the present disclosure estimate the radar mount angle by iterating over a range of possible mount angle values (candidate angles), computing the localized occupancy grid map, and selecting the angle corresponding to the occupancy grid map that spans the minimum number of grid cells.

Figure 2:
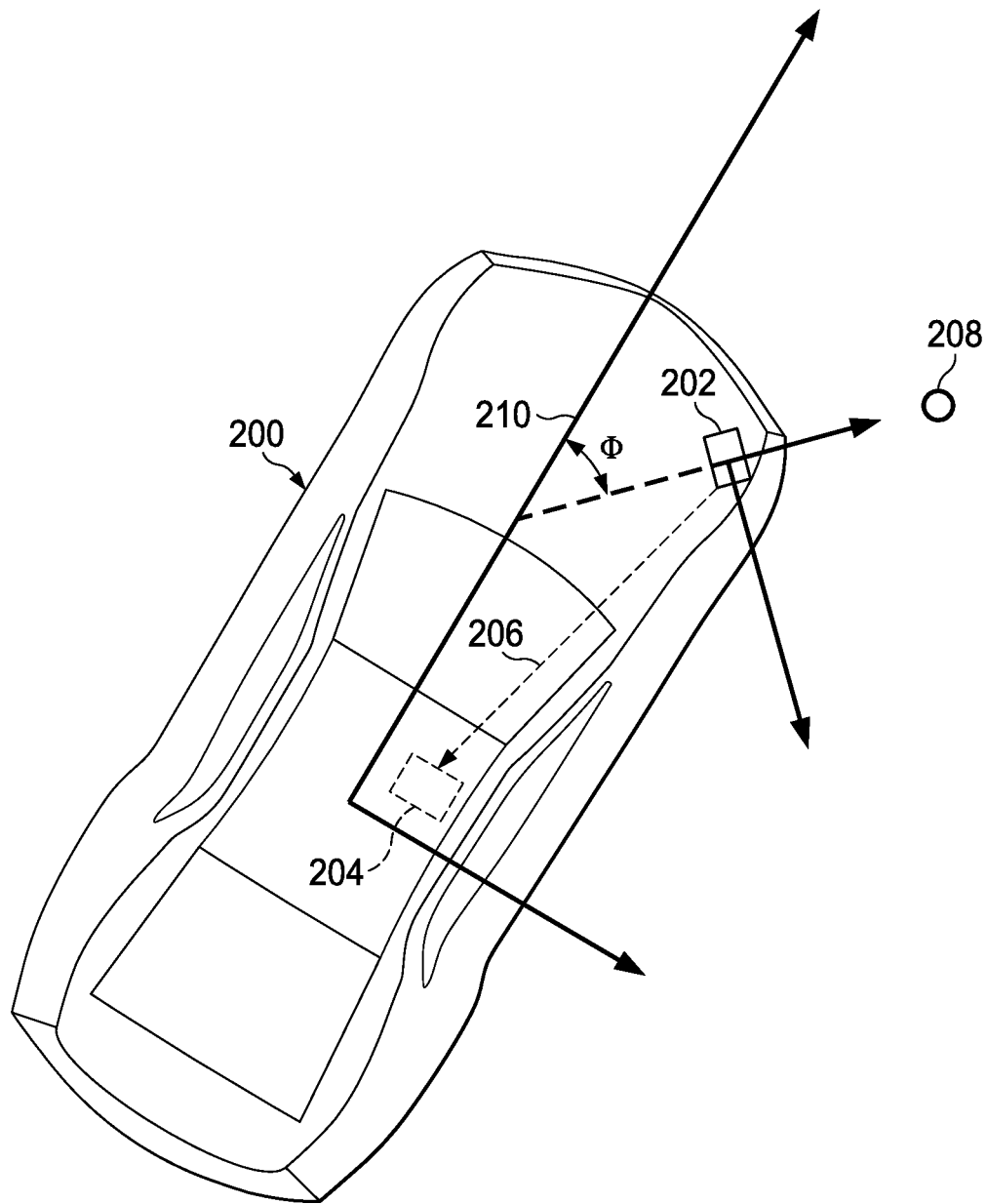
FIG. 2 shows an example vehicle that includes a radar sensor and mount angle calibration in accordance with this description.

FIG. 2 shows an example vehicle 200 that includes apparatus for radar mount angle calibration in accordance with the present description. The vehicle 200 includes a radar sensor 202 and a computer system 204. The radar sensor 202 is mounted at angle Ø with respect to the vehicle axis 210. The radar sensor 202 provides radar signals 206 to the computer system 204, and the computer system 204 processes the radar signals 206 to determine the mount angle of the radar sensor 202. The computer system 204 may be mounted anywhere in the vehicle 200, and the radar sensor 202 may be mounted adjacent any outer surface of the vehicle 200. The computer system 204 includes one or more processors (e.g., general-purpose microprocessors, microcontrollers, digital signal processors, etc.) that process the radar signals 206 to determine the mount angle of the radar sensor 202. In some implementations, the computer system 204 may include an interface that provides the radar signals 206 to an external processing system that processes the radar signals 206 to determine the mount angle of the radar sensor 202.

Figure 3:
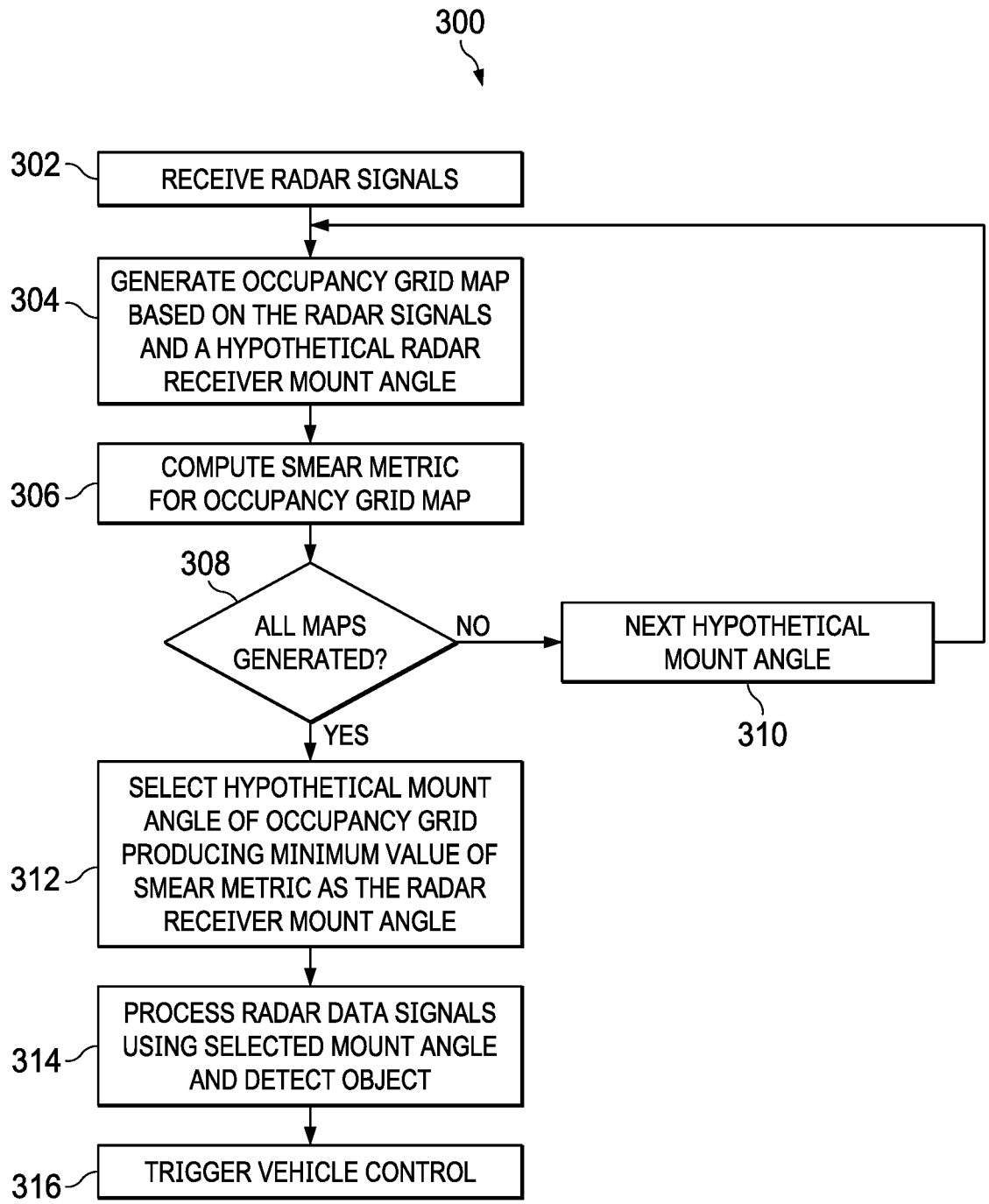
FIG. 3 shows an example method for calibrating the mount angle of a radar sensor in accordance with this description.

FIG. 3 shows a flow diagram for a method calibrating the mount angle of a radar sensor for in accordance with the present disclosure. Though depicted sequentially as a matter of convenience, at least some of the actions shown can be performed in a different order and/or performed in parallel. Additionally, some implementations may perform only some of the actions shown. Operations of the method 300 may be performed by an implementation of the computer system 204.

In block 302, the radar sensor 202 receives reflections from the stationary object 208 in the environment of the vehicle 200 as the vehicle 200 moves relative to the stationary object 208, e.g., as the vehicle 200 moves past the stationary object 208. The radar sensor 202 passes the radar signals 206 to the computer system 204.

In block 304, the computer system 204 processes the radar signals 206 to identify locations of the stationary object 208 as the vehicle 200 moves relative to the stationary object 208 and generates an occupancy grid map for the locations. The occupancy grid map is generated based on one of multiple unique hypothetical mount angles (candidate angles) of the radar sensor 202. The occupancy grid map may show occupancy only for an area (e.g., a predetermined area) about the stationary object 208. The occupancy grid map may be stored in memory as a two-dimensional array for processing in block 306. The occupancy grid map need not be plotted or displayed.

In block 306, the computer system 204 generates a smear metric for the occupancy grid map generated in block 304. The smear metric may be computed as a number of grid cells in which the object appears in the occupancy grid map. Thus, the computer system 204 may count the number of grid cells of each occupancy grid map that are assigned to an object. The higher the number of grid cells in which the object appears the higher the smear metric, and the lower the number of grid cells in which object appears the lower the smear metric.

In block 308, the computer system 204 determines whether an occupancy grid map has been generated for each of the multiple hypothetical mount angles of the radar sensor 202. If additional occupancy grid maps are to be generated, then, in block 310, a next hypothetical mount angle is selected. The hypothetical mount angle is applied to locate the stationary object 208 using the radar signals 206 acquired in block 302, and to generate an additional occupancy grid map corresponding to this hypothetical mount angle in block 304.

If all the occupancy grid maps have been generated (e.g., an occupancy grid map has been generated for each hypothetical mount angle), then, in block 312, the computer system 204 selects the mount angle of the radar sensor 202 to be the one of the multiple hypothetical mount angles applied in block 304 that produced the lowest value for the smear metric in block 306.

The operations of blocks 302-312 may be performed as needed to calibrate the radar sensor 202. For example, the mount angle selected in block 312 is accurate until the radar sensor 202 changes orientation (e.g., due to shock or wear). When the mount angle of the radar sensor 202 changes, the operations of blocks 302-312 may be repeated to determine a new mount angle.

In block 314, the computer system 204 uses the mount angle selected in block 312 to process the radar signals 206 and correctly locate an object external to the vehicle 200.

In block 316, the computer system 204 triggers control the vehicle 200 based on the identified object. For example, the computer system 204 may control autonomous driving of the vehicle 200, control automated parking of the vehicle 200, control blind-spot monitoring in the vehicle 200, control a cruise control of the vehicle 200, or control other automotive system of the vehicle 200.

The vehicle 200 may include any number of radar sensors 202, and the computer system 204 may apply the method 300 to calibrate the mount angle of each of the radar sensors.

Figure 5:
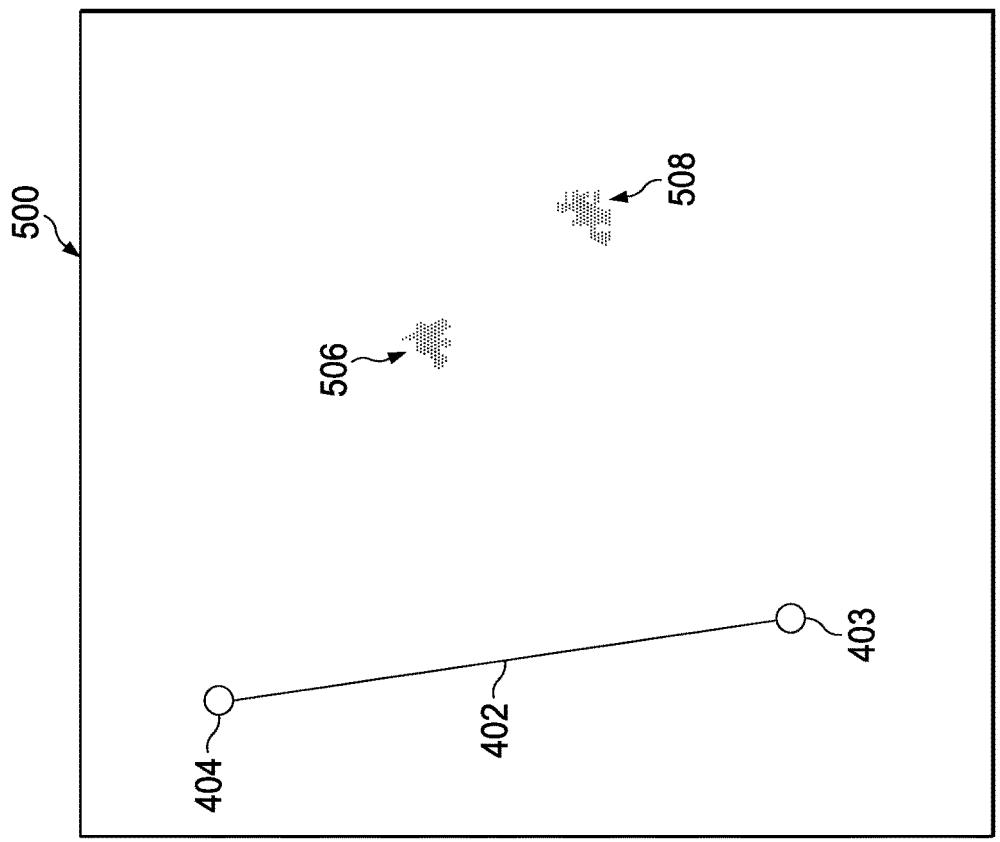
FIGS. 4 and 5 show example occupancy grid maps generated using different hypothetical mount angles in accordance with this description.
Figure 4:
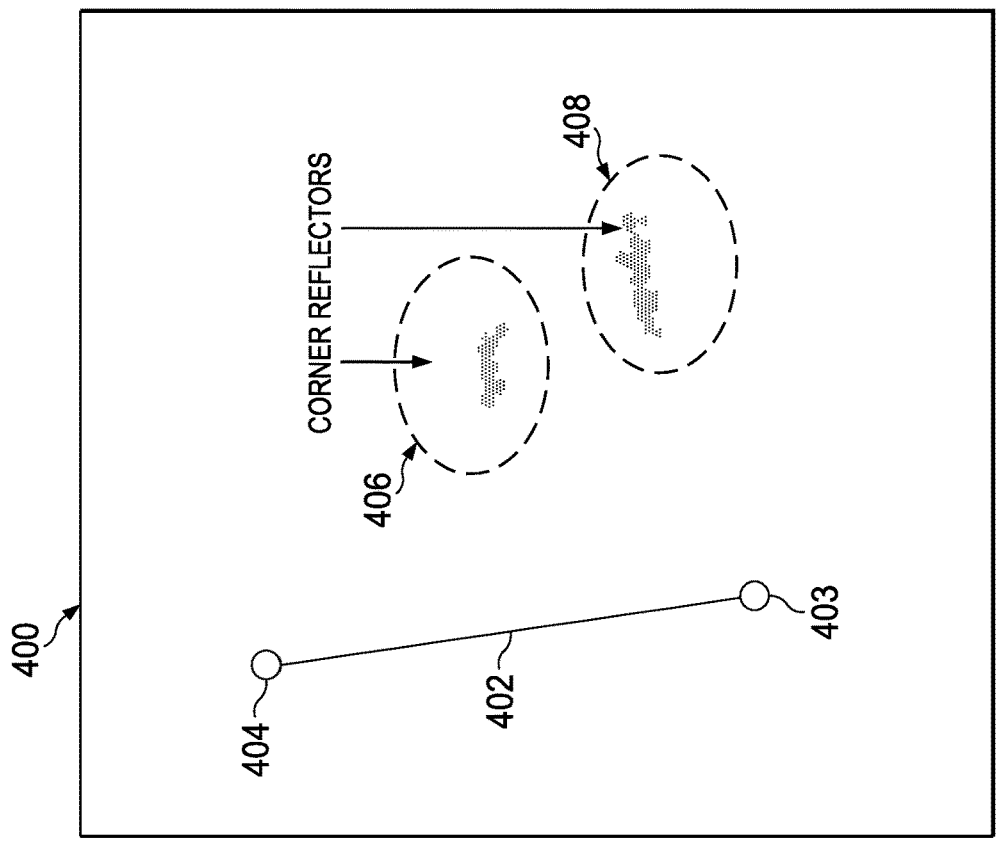

FIGS. 4 and 5 show examples of occupancy grid maps generated by the computer system 204 using the radar signal 206 acquired as the vehicle 200 moves relative to two objects along a line 402 from a starting point 403 to an ending point 404. The objects may be corner reflectors, a metallic sphere, or any stationary object that produces point-like reflections in the operational environment of the vehicle 200. The occupancy grid map 400 is generated using a first hypothetical mount angle of the radar sensor 202, and the occupancy grid map 500 is generated using a second hypothetical mount angle of the radar sensor 202. The first hypothetical mount angle is different from the second hypothetical mount angle. The number of grid cells 406 occupied for a first object in the occupancy grid map 400 is different from the number of grid cells 506 occupied for the first object in the occupancy grid map 500. Similarly, the number of grid cells 408 occupied for a second object in the occupancy grid map 400 is different from the number of grid cells 508 occupied for the second object in the occupancy grid map 500. Thus, the hypothetical mount angle of the radar sensor 202 applied to generate the occupancy grid map 500 may be more accurate than the hypothetical mount angle of the radar sensor 202 applied to generate the occupancy grid map 400.

Figure 6:
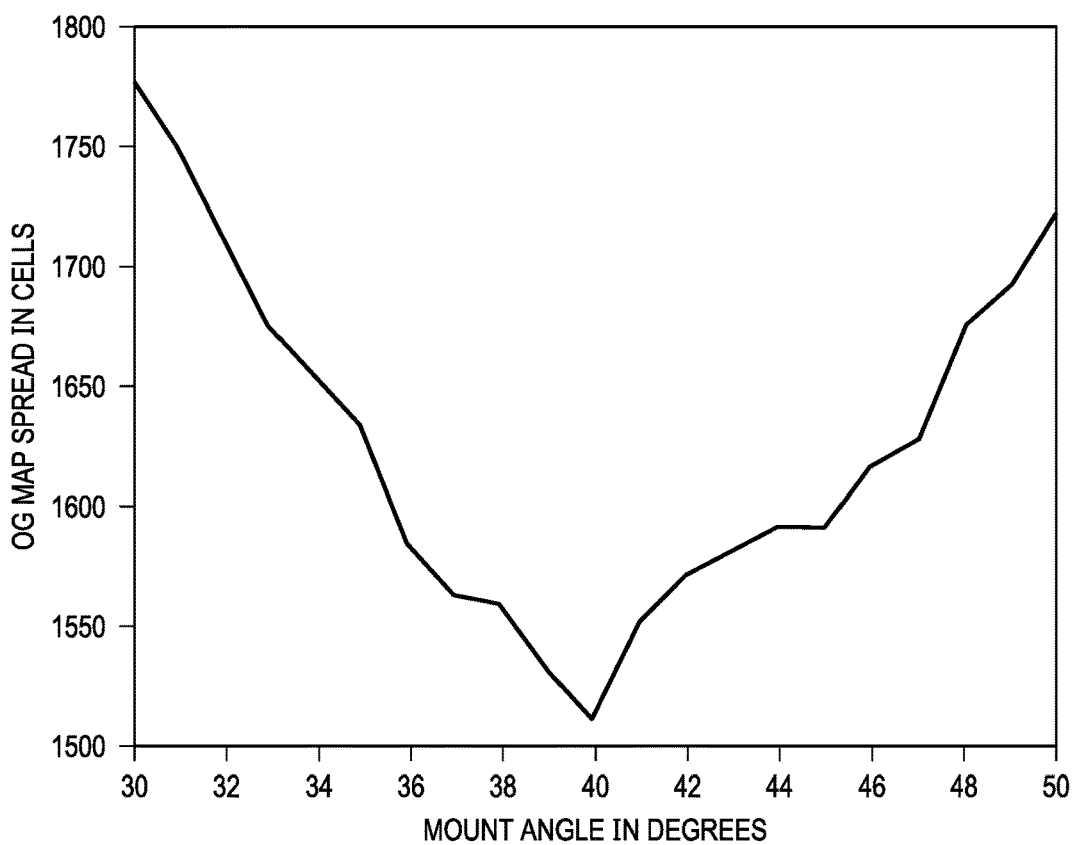
FIG. 6 shows a graph of radar sensor mount angle versus number of occupied cells of an occupancy grid map in accordance with this description.

FIG. 6 shows a graph 600 of hypothetical mount angle of the radar sensor 202 versus the number of cells of an occupancy grid map occupied by an object identified using the radar sensor 202 (smear metric). The values graphed in FIG. 6 may be generated by the computer system 204 using the method 300 to calibrate the radar sensor 202. In the graph 600, the minimum number of occupied cells arises with application of a hypothetical mount angle of about 40°. The number of occupied cells increases with hypothetical mount angle values less than or greater than 40°. Accordingly, based on the smear metric values shown in the graph 600, the computer system 204 may select 40° as the mount angle of the radar sensor 202.

Figure 7:
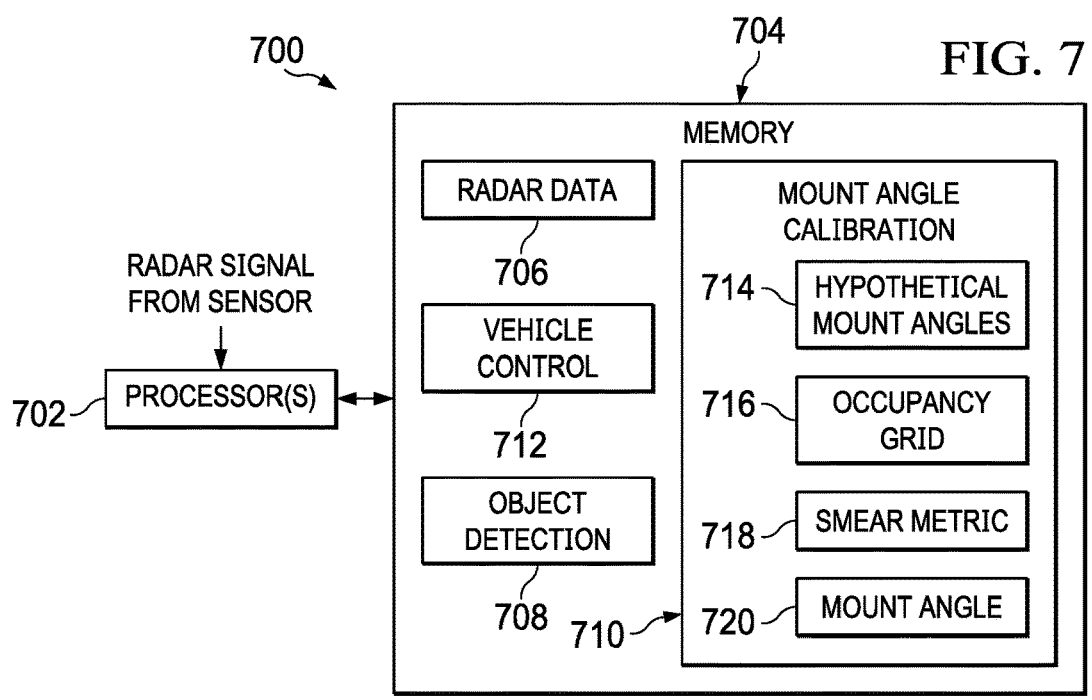
FIG. 7 shows a block diagram for an example computer system suitable for calibrating a radar sensor mount angle in accordance with this description.

FIG. 7 shows a block diagram for an example computer system 700 suitable for calibrating the radar sensor 202 and applying a radar signal to control the vehicle 200. The computer system 700 is an implementation of the computer system 204. The computer system 700 includes one or more processor(s) 702 and a memory 704. The processor(s) 702 may include a general-purpose microprocessor, a digital signal processor, a graphics processor, and/or any other instruction execution circuits. The processor(s) 702 is coupled to the memory 704, and coupled to one or more radar sensors, such as the radar sensor 202.

The memory 704 stores instructions that are retrieved and executed by the processor(s) 702 to process a received radar signal for calibration of the radar sensor, and, in some implementations, to control the vehicle 200. The memory 704 stores radar data 706, object detection instructions 708, mount angle calibration instructions 710, and vehicle control instructions 712. The radar data 706 includes radar signals stored for use, by the processor(s) 702, in calibration and/or vehicle control. The radar data 706 includes radar signals (multiple radar scans) acquired as the vehicle 200 moves about (e.g., past) one or more stationary objects.

The object detection instructions 708 include instructions that process the radar data 706 to detect an object and determine a location of the object based on a radar mount angle, receipt of reflected radar signals, and transmission to reception delay time of the reflected radar signals.

The mount angle calibration instructions 710 include instructions for determining the mount angle of the radar sensor 202. The mount angle calibration instructions 710 includes a set of hypothetical mount angles 714, occupancy grid computation instructions 716, smear metric computation instructions 718, and mount angle selection instructions 720 for the radar sensor 202. The hypothetical mount angles 714 includes a plurality of hypothetical mount angles (candidate angles), each of which is to be applied to process the radar data 706. For example, the hypothetical mount angles 714 may include hypothetical mount angles at one-degree increments, ½-degree increments, ⅒-degree increments, etc.

The occupancy grid computation instructions 716 include instructions for generating an occupancy grid map (such as the occupancy grid map 400 or the occupancy grid map 500)

for the radar data 706 based on multiple hypothetical mount angles. The occupancy grid computation instructions 716 generate a different occupancy grid map for each of the hypothetical mount angles. Each occupancy grid map illustrates the locations of a detected object with the applied hypothetical mount angle as the vehicle 200 moves about the object.

The smear metric computation instructions 718 include instructions to compute a smear metric for each of the occupancy grid maps generated by the 176. The smear metric computation instructions 718 compute the smear metric for an occupancy grid map as a count of the number of cells of the occupancy grid map in which a target object is located.

The mount angle selection instructions 720 compare the smear metrics generated by the smear metric computation instructions 718, and select the hypothetical mount angle that produced the occupancy grid map having the lowest value of smear metric to be the mount angle for the radar sensor (e.g., the radar sensor 202) that generated the radar data 706.

The object detection instructions 708 apply the mount angle selected by the mount angle selection instructions 720 to identify objects based on the radar data 706.

The vehicle control instructions 712 control the vehicle 200 based on an object (and the location of the object) identified by the object detection instructions 708. The vehicle control instructions 712 may control autonomous driving, automated parking, blind-spot monitoring, cruise control, and/or other automotive functions, each of which is based on identification of an object using the radar data 706 and the radar mount angle selected by the mount angle calibration instructions 710. In some implementations of the computer system 700, the processor(s) 702 trigger a vehicle control system external to the computer system 700 to perform the control functions described with respect to the vehicle control instructions 712.

Modifications are possible in the described embodiments, and other embodiments are possible, within the scope of the claims.

What is claimed is:

1. A device, comprising:
one or more processors configured to:
  receive radar data;
  generate, based on the radar data, a first occupancy grid map corresponding to a first candidate angle;
  determine a first number of grid cells occupied for an object in the first occupancy grid map;
  generate, based on the radar data, a second occupancy grid map corresponding to a second candidate angle;
  determine a second number of grid cells occupied for the object in the second occupancy grid map;
  select the first candidate angle as a sensor mount angle in response to determining that the first number is less than the second number; and
  trigger an action based on the sensor mount angle and the radar data.

2. The device of claim 1,
wherein the device is configured to mount on a vehicle, and
wherein the one or more processors are configured to determine, based on the sensor mount angle and the radar data, a location of the object relative to the vehicle.

3. The device of claim 1, wherein the action is one of control of an automotive system, automated parking of a vehicle, automated driving of a vehicle, blind-spot monitoring, or control of a cruise control of a vehicle.

4. The device of claim 1, wherein the radar data comprises multiple scans of the object.

5. The device of claim 4, wherein each of the occupancy grid maps includes a position of the object according to each of the scans.

6. The device of claim 1,
wherein the one or more processors are configured to determine the first number by counting cells of the first occupancy grid map assigned to the object, and
wherein the one or more processors are configured to determine the second number by counting cells of the second occupancy grid map assigned to the object.

7. The device of claim 1, wherein the first candidate angle is different from the second candidate angle.

8. The device of claim 1, wherein the one or more processors are further configured to:
generate, based on the radar data, a third occupancy grid map corresponding to a third candidate angle;
determine a third number of grid cells occupied for the object in the third occupancy grid map;
determine that the first number is less than the second number and less than the third number; and
select the first candidate angle as the sensor mount angle in response to determining that the first number is less than the second number and less than the third number.

9. A method, comprising:
receiving radar signals reflected by an object;
generating, based on the radar signals, a first occupancy grid map corresponding to a first candidate angle;
determining a first number of grid cells occupied for the object in the first occupancy grid map;
generating, based on the radar signals, a second occupancy grid map corresponding to a second candidate angle;
determining a second number of grid cells occupied for the object in the second occupancy grid map;
selecting the first candidate angle as a sensor mount angle in response to determining that the first number is less than the second number; and
triggering an action based on the sensor mount angle and the radar signals.

10. The method of claim 9, further comprising moving a radar sensor with respect to the object while receiving the radar signals.

11. The method of claim 9, further comprising determining, based on the sensor mount angle and the radar signals, a location of the object relative to a vehicle,
wherein receiving the radar signals occurs at a receiver mounted on the vehicle.

12. The method of claim 9, wherein triggering the action comprises one of controlling an automotive system, performing automated parking of a vehicle, performing automated driving of a vehicle, performing blind-spot monitoring, or adjusting a cruise control of a vehicle.

13. The method of claim 9,
wherein determining the first number comprises counting cells of the first occupancy grid map assigned to the object, and
wherein determining the second number comprises counting cells of the second occupancy grid map assigned to the object.

14. The method of claim 9, wherein the first candidate angle is different from the second candidate angle.

15. The method of claim 9, further comprising:
generating, based on the radar signals, a third occupancy grid map corresponding to a third candidate angle;
determining a third number of grid cells occupied for the object in the third occupancy grid map; and
determining that the first number is less than the second number and less than the third number,
wherein selecting the first candidate angle as the sensor mount angle is in response to determining that the first number is less than the second number and less than the third number.

16. A vehicle, comprising:
a radar sensor configured to receive radar signals reflected by an object;
one or more processors coupled to the radar sensor, and configured to:
  generate, based on the radar signals, a first occupancy grid map corresponding to a first candidate angle;
  determine a first number of grid cells occupied for the object in the first occupancy grid map;
  generate, based on the radar signals, a second occupancy grid map corresponding to a second candidate angle;
  determine a second number of grid cells occupied for the object in the second occupancy grid map;
  select the first candidate angle as a mount angle of the radar sensor in response to determining that the first number is less than the second number; and
  control the vehicle based on the mount angle and the radar signals.

17. The vehicle of claim 16, wherein the one or more processors are configured to determine, based on the radar signals and the mount angle, a location of the object relative to the vehicle.

18. The vehicle of claim 16,
wherein the one or more processors are configured to determine the first number by counting cells of the first occupancy grid map assigned to the object, and
wherein the one or more processors are configured to determine the second number by counting cells of the second occupancy grid map assigned to the object.

19. The vehicle of claim 16, wherein the first candidate angle is different from the second candidate angle.

20. The vehicle of claim 16, wherein the one or more processors are further configured to:
generate, based on the radar signals, a third occupancy grid map corresponding to a third candidate angle;
determine a third number of grid cells occupied for the object in the third occupancy grid map;
determine that the first number is less than the second number and less than the third number; and
select the first candidate angle as the mount angle in response to determining that the first number is less than the second number and less than the third number.

* * * * *